(12) United States Patent
Albright et al.

(10) Patent No.: US 7,629,049 B2
(45) Date of Patent: *Dec. 8, 2009

(54) HEMOCOMPATIBLE POLYMER SYSTEMS AND RELATED DEVICES

(75) Inventors: Robert L. Albright, Southampton, PA (US); Vincent J. Capponi, Monmouth Junction, NJ (US); Thomas D. Golobish, Princeton, NJ (US)

(73) Assignee: Medasorb, Inc., Monmouth Junction, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/710,844

(22) Filed: Feb. 26, 2007

(65) Prior Publication Data
US 2007/0160848 A1    Jul. 12, 2007

Related U.S. Application Data

(63) Continuation-in-part of application No. 11/081,249, filed on Mar. 16, 2005, now Pat. No. 7,201,962, which is a continuation of application No. 10/273,249, filed on Oct. 18, 2002, now Pat. No. 6,884,829.

(51) Int. Cl.
*B32B 7/04* (2006.01)
*B32B 27/08* (2006.01)
*B32B 27/18* (2006.01)
*B32B 27/20* (2006.01)
*B32B 27/30* (2006.01)

(52) U.S. Cl. .................. 428/407; 428/403; 428/522; 428/523; 523/200; 523/201; 523/202; 523/205; 523/206; 521/65; 521/69; 521/70; 521/72; 427/2.13; 427/2.14; 427/213.3; 427/213.34; 427/213.35; 427/213.36

(58) Field of Classification Search .............. None
See application file for complete search history.

(56) References Cited

U.S. PATENT DOCUMENTS

| | | | |
|---|---|---|---|
| 3,664,506 A * | 5/1972 | Meunier et al. ............ 210/282 |
| 3,880,771 A * | 4/1975 | Klein ...................... 516/77 |
| 4,046,720 A | 9/1977 | Rembaum et al. |
| 4,140,652 A * | 2/1979 | Korshak et al. ........... 525/54.1 |
| 4,171,283 A | 10/1979 | Nakashima et al. ........ 502/402 |
| 4,192,921 A * | 3/1980 | Dales ..................... 521/38 |
| 4,232,004 A | 11/1980 | Dodd |
| 4,283,499 A * | 8/1981 | Howell ................... 521/38 |
| 4,384,954 A * | 5/1983 | Nakashima et al. ........ 210/287 |
| 4,420,395 A * | 12/1983 | Tanihara et al. .......... 210/263 |
| 4,421,684 A * | 12/1983 | Nakashima et al. ........ 530/364 |
| 4,472,303 A * | 9/1984 | Tanihara et al. .......... 530/359 |
| 4,634,604 A * | 1/1987 | Tlustakova et al. ..... 427/213.33 |
| 4,725,355 A * | 2/1988 | Yamamoto et al. ......... 210/266 |
| 5,013,585 A | 5/1991 | Shimizu et al. |
| 5,064,668 A | 11/1991 | Klemann et al. |
| 5,169,754 A | 12/1992 | Siiman et al. |
| 5,326,738 A | 7/1994 | Sandoval et al. |
| 5,547,575 A * | 8/1996 | Demmer et al. ........... 210/490 |
| 5,589,396 A | 12/1996 | Frye et al. |
| 5,633,316 A | 5/1997 | Gartner et al. |
| 5,639,620 A | 6/1997 | Siiman et al. |
| 5,683,800 A | 11/1997 | Stringfield et al. |
| 5,728,437 A * | 3/1998 | Nygren et al. ............ 428/35.7 |
| 5,773,384 A | 6/1998 | Davankov et al. |
| 5,776,706 A | 7/1998 | Siiman et al. |
| 5,807,636 A | 9/1998 | Sheu et al. |
| 5,897,953 A | 4/1999 | Ogawa et al. |
| 5,904,663 A | 5/1999 | Braverman et al. |
| 5,922,161 A | 7/1999 | Wu et al. |
| 5,935,845 A | 8/1999 | Koontz |
| 5,945,457 A * | 8/1999 | Plate et al. .............. 514/772.1 |
| 6,087,300 A | 7/2000 | Davankov et al. |
| 6,103,126 A | 8/2000 | Boos et al. |
| 6,114,466 A | 9/2000 | Davankov et al. |
| 6,127,311 A | 10/2000 | Davankov et al. |
| 6,133,383 A | 10/2000 | Davankov et al. |
| 6,136,424 A | 10/2000 | Davankov et al. |
| 6,153,707 A | 11/2000 | Davankov et al. |
| 6,156,851 A | 12/2000 | Davankov et al. |
| 6,159,377 A | 12/2000 | Davankov et al. |
| 6,238,795 B1 | 5/2001 | Strom et al. |
| 6,303,702 B1 | 10/2001 | Davankov et al. |
| 6,325,939 B2 * | 12/2001 | Strom et al. ............. 210/645 |
| 6,338,801 B2 | 1/2002 | Strom et al. |
| 6,408,894 B1 | 6/2002 | Davankov |
| 6,416,487 B1 | 7/2002 | Braverman et al. |
| 6,531,523 B1 * | 3/2003 | Davankov et al. .......... 523/201 |
| 6,774,178 B2 * | 8/2004 | Turek et al. ............. 524/858 |
| 6,878,269 B2 * | 4/2005 | Nanko et al. ............. 210/259 |
| 6,884,829 B2 * | 4/2005 | Albright ................. 523/201 |
| 7,019,085 B2 * | 3/2006 | Albright ................. 525/360 |
| 7,112,620 B2 * | 9/2006 | Albright ................. 523/201 |

(Continued)

Primary Examiner—Vivian Chen
(74) Attorney, Agent, or Firm—Dan M. De La Rosa, Esq.

(57) ABSTRACT

A polymer system and device with a hemocompatible film or coated polymers is provided, the polymer system comprises an organic phase and an aqueous phase, the organic phase comprises polymerizable monomers and at least one initiator and the aqueous phase comprises at least one dispersing agent, at least one free radical inhibitor and at least one buffering agent, the organic phase is immiscible in the aqueous phase, and the dispersing agent forms a hemocompatible surface on the polymer, and the device comprises a housing for containing the polymer system.

8 Claims, No Drawings

U.S. PATENT DOCUMENTS

| | | | |
|---|---|---|---|
| 7,201,962 B2 * | 4/2007 | Albright | 428/407 |
| 7,214,316 B2 * | 5/2007 | Albright | 210/502.1 |
| 2003/0224974 A1 * | 12/2003 | Bolotin | 514/6 |
| 2004/0076827 A1 * | 4/2004 | Albright | 428/403 |
| 2004/0076845 A1 * | 4/2004 | Albright | 428/515 |
| 2005/0159508 A1 * | 7/2005 | Albright | 523/201 |
| 2006/0047086 A1 * | 3/2006 | Albright | 525/340 |
| 2006/0116485 A1 * | 6/2006 | Albright | 525/360 |

* cited by examiner

HEMOCOMPATIBLE POLYMER SYSTEMS AND RELATED DEVICES

RELATED APPLICATION

This application is a continuation-in-part application of U.S. application Ser. No. 11/081,249, entitled "A Hemocompatible Coated Polymer & Related One-Step Methods" which was filed on Mar. 16, 2005 and issued as U.S. Pat. No. 7,201,962 and which is a continuation application of U.S. application Ser. No. 10/273,249, entitled "A Hemocompatible Coated Polymer & Related One-Step Methods" which was filed on Oct. 18, 2002 and issued as U.S. Pat. No. 6,884,829.

BACKGROUND OF THE INVENTION

1. Field of the Invention

The present invention relates to a hemocompatible surface coated polymer system comprising an organic phase and an aqueous phase. More specifically, the present invention relates to polymer having organic and aqueous phases, where the organic phase comprises polymerizable monomers and at least one initiator and the aqueous phase comprises at least one dispersing agent, at least one free radical inhibitor and at least one buffering agent, and the organic phase is immiscible in the aqueous phase, and the dispersing agent forms a hemocompatible surface on the polymer. The invention further provides for additional dispersants and devices and apparati containing the hemocompatible polymers.

2. Description of Related Art

It has been known and practiced in the art of suspension polymerization to manufacture polymers with a hemocompatible coating using a two-step process. In the first step of the two-step process, polymeric beads are manufactured by polymerizing monomer droplets using suspension polymerization. In the second step of the process, a hemocompatibilizing film is applied onto the exterior surface of the polymer to provide the hemocompatible coating. Unlike the prior art, the polymers of the present invention have aqueous and organic phases where the organic phase is immiscible in the aqueous phase, and the dispersing agent used in the aqueous phase forms a hemocompatible surface on the polymer.

SUMMARY OF THE INVENTION

The present invention provides for hemocompatible coated polymer system comprising an organic phase and an aqueous phase. In one embodiment, the organic phase comprises polymerizable monomers and at least one initiator and the aqueous phase comprises at least one dispersing agent, at least one free radical inhibitor and at least one buffering agent. In another embodiment, the organic phase of the system of the present invention is immiscible in the aqueous phase, and the dispersing agent forms a hemocompatible surface on the polymer.

In still another embodiment, the monomer is a monofunctional monomer, and the monofunctional monomer is selected from a group consisting of styrene, ethylstyrene, acrylonitrile, butyl methacrylate, octyl methacrylate, butyl acrylate, octyl acrylate, cetyl methacrylate, cetyl acrylate, ethyl methacrylate, ethyl acrylate, vinyltoluene, vinylnaphthalene, vinylbenzyl alcohol, vinylformamide, methyl methacrylate, methyl acrylate and mixtures thereof.

In yet another embodiment, the monomer is a polyfunctional monomer, and the polyfunctional monomer is selected from a group consisting of divinylbenzene, trivinylbenzene, divinylnaphthalene, trivinylcyclohexane, divinylsulfone, trimethylolpropane trimethacrylate, trimethylolpropane dimethacrylate, trimethylolpropane triacrylate, trimethylolpropane diacrylate, pentaerythritol dimethacrylate, pentaerythritol trimethacrylate, pentaerythritol tetramethacrylate, pentaerythritol diacrylate, pentaerythritol triiacrylate, pentaerythritol tetraacrylate, dipentaerythritol dimethacrylate, dipentaerythritol trimethacrylate, dipentaerythritol tetramethacrylate, dipentaerythritol diacrylate, dipentaerythritol triacrylate, dipentaerythritol tetraacrylate, divinylformamide and mixtures thereof.

In still yet another embodiment, the initiator of the system of the present invention is selected from a group consisting of diacyl peroxides, ketone peroxides, peroxyesters, dialkyl peroxides, peroxyketals, azoalkylnitriles, peroxydicarbonates and mixtures thereof. In a further embodiment, the dispersing agent is selected from a group consisting of poly(N-vinylpyrrolidinone), hydroxyethyl cellulose, hydroxypopyl cellulose, poly(hydroxyethyl methacrylate), poly(hydroxyethyl acrylate), poly(hydroxypropyl methacrylate), poly(hydroxypropyl acrylate), poly(dimethylaminoethyl methacrylate), poly-(dimethylaminoethyl acrylate), poly(diethylamimoethyl methacrylate), poly-(diethylaminoethyl acrylate), poly(vinyl alcohol), salts of poly(methacrylic acid), and salts of poly (acrylic acid) and mixtures thereof.

In still a further embodiment, the free radical inhibitor is selected from a group consisting of p-nitrosophenoxide salts, sodium nitrite, N-hydroxy-N-methylglucamine, N-nitroso-N-methylglucamine and mixtures thereof. In yet a further embodiment, the buffering agent is selected from a group consisting of carbonate salts, bicarbonate salts, boric acid salts, salts of phosphoric acid and mixtures thereof. In still yet a further embodiment, the organic phase further comprises at least one porogen, and the porogen is selected from a group consisting of aliphatic hydrocarbons, dialkyl ketones, aliphatic carbinols and mixtures thereof. In another further embodiment, the polymer is a porous polymer.

In still another further embodiment, the present invention relates to a hemocompatible surface coated polymer system comprising an organic phase and an aqueous phase, the system being manufactured by a method comprising: forming the organic phase comprising polymerizable monomers and at least one initiator; forming the aqueous phase comprising at least one dispersant agent, at least one free radical inhibitor, and at least one buffering agent; dispersing the organic phase into the aqueous phase to thereby form organic phase droplets; and polymerizing the organic phase droplets coated with the dispersing agent to thereby form the hemocompatible surface coating on the polymer. In yet another further embodiment, the polymerization of the organic phase is formed by heating a mixture of the organic and aqueous phases.

In still yet another further embodiment, the present invention relates to a method of manufacturing a hemocompatible surface coated polymer system comprising an organic phase and an aqueous phase, the method comprising: forming the organic phase comprising polymerizable monomers and at least one initiator; forming the aqueous phase comprising at least one dispersant agent, at least one free radical inhibitor, and at least one buffering agent; dispersing the organic phase into the aqueous phase by agitation to form a suspension of organic droplets; and polymerizing the organic phase by heating the suspension of the organic phase droplets coated with the dispersing agent to thereby form the hemocompatible surface coating on the polymer.

In another embodiment, the present invention relates to a polymer with a hemocompatible coating comprising at least one crosslinking agent for making the polymer and at least one dispersing agent whereby the dispersing agent forms a hemocompatible surface on the polymer.

In another embodiment, the biocompatibilizing polymer comprises poly(N-vinylpyrrolidinone). In still another embodiment, the biocompatibilizing polymer is selected from a group consisting of poly(hydroxyethyl methacrylate), poly(hydroxyethyl acrylate), poly(dimethylaminoethyl methacrylate), salts of poly(acrylic acid), salts of poly(methacrylic acid), poly(diethylaminoethyl methacrylate), poly(hydroxypropyl methacrylate), poly(hydroxypropyl acrylate), poly(N-vinylpyrrolidinone), poly(vinyl alcohol) and mixtures thereof. In another embodiment, the salts may be sodium and potassium salts and in still another embodiment, the salts are water-soluble salts.

In yet another embodiment, the dispersing agent is selected from a group consisting of hydroxyethyl cellulose, hydroxypopyl cellulose, poly(hydroxyethyl methacrylate), poly(hydroxyethyl acrylate), poly(hydroxypropyl methacrylate), poly(hydroxypropyl acrylate), poly(dimethylaminoethyl methacrylate), poly(dimethylaminoethyl acrylate), poly(diethylamimoethyl methacrylate), poly(diethylaminoethyl acrylate), poly(vinyl alcohol), salts of poly(methacrylic acid), and salts of poly(acrylic acid) and mix thereof.

In still another embodiment, the crosslinking agent is selected from a group consisting of divinylbenzene, trivinylbenzene, divinylnaphthalene, trivinylcyclohexane, divinylsulfone, trimethylolpropane trimethacrylate, trimethylolpropane dimethacrylate, trimethylolpropane triacrylate, trimethylolpropane diacrylate, pentaerythrital tetra-, tri-, and dimethacrylates, pentaerythritol tetra-, tri- and diacrylates, dipentaerythritol tetra, tri-, and dimethacrylates, dipentaerythritol tetra-, tri-, and diacrylates, divinylformamide, and mixtures thereof.

In still yet another embodiment, the crosslinking agent comprises divinylbenzene. In a further embodiment, the crosslinking agent comprises trivinylcylohexane. In yet a further embodiment, the crosslinking agent comprises trivinylbenzene.

In still a further embodiment, the crosslinking agent comprises copolymers of divinylbenzene with comonomers being selected from a group consisting of styrene, ethylstyrene, acrylonitrile, butyl methacrylate, octyl methacrylate, butyl acrylate, octyl acrylate, cetyl methacrylate, cetyl acrylate, ethyl methacrylate, ethyl acrylate, vinyltoluene, vinylnaphthalene, vinylbenzyl alcohol, vinylformamide, methyl methacrylate, methyl acrylate and mixtures thereof.

In still yet a further embodiment, the polymer with the hemocompatible surface is a porous polymer. In another further embodiment, the polymer with the hemocompatible surface is an ion exchange polymer. In a further embodiment, the polymer is an affinity polymer. In yet another further embodiment, the biocompatibilizing polymer becomes grafted to the surface of the polymer to provide a polymer with the hemocompatible surface. For purposes of this invention, the term "grafting" is defined as chemically bonded with potential entanglement such that the dispersing agent is physically restricted from leaving the surface of the polymer.

In another embodiment, the present invention relates to a polymer manufactured by a process comprising: simultaneously polymerizing and coating with at least one crosslinking agent for making the polymer and using at least one dispersing agent to form a hemocompatible coated polymer.

For purposes of this invention, the term "hemocompatibility" is defined as a condition whereby a material, when placed in contact with whole blood and blood components or physiological fluids, results in clinically acceptable physiological changes. In another embodiment, the dispersing agent is a biocompatibilizing polymer. A "biocompatibilizing polymer" is defined as a polymer, which forms a surface over a non-biocompatible material, making the polymeric system compatible with physiological fluids and tissues. The term "crosslinking agent" is defined as a linking agent such as a polyfunctional monomer that links two or more polymer chains or segments of the same polymer chain together. The term "dispersing agent" is defined as a substance that imparts a stabilizing effect upon a finely divided array of immiscible particles suspended in a fluidizing medium. The immiscible particles can be a solid, liquid or gas and the fluidizing medium can be a liquid or a gas.

In another embodiment, the crosslinking agent is polymerized with at least one vinyl monomer. In a further embodiment, the dispersing agent forms a hemocompatible coating on a surface of the polymer. In yet a further embodiment, the coating of the polymer is equivalent to the surface of the polymer.

In still a further embodiment, the polymer is processed in non-pyrogenic water. For purposes of this invention, "non-pyrogenic" shall be defined by U.S.P. 25, Monograph (151) Pyrogenic Test, U.S. Pharmacopeia National Formulary.

In still yet another embodiment, the polymer of the present invention is prepared by suspension polymerization. For purposes of the invention, suspension polymerization is defined as the polymerization of monomer droplets dispersed in an immiscible liquid. Based upon an Elemental Analysis of the Polymer's Surface by X-Ray Photoelectron Spectroscopy (XPS), the dispersing agent becomes chemically grafting onto the surface of the polymer as the monomer droplets are transformed into polymeric beads. Polymers coated with poly(N-vinylpyrrolidinone) have been found to be biocompatible and hemocompatible. The hemocompatible polymers of the present invention pass the Lee White clotting tests and the tests for the hemolysis of red blood cells.

In another embodiment, the polymer of the present invention is a porous polymer. The term "porous polymer" is defined as a polymer particle having an internal pore structure with a porosity resulting from voids or holes throughout the polymer matrix. In still another embodiment, the polymer is an ion exchange resin or polymer. An ion exchange resin or polymer is a resin or polymer carrying ionogenic groups that are capable of exchanging ions or of sequestering ions. The ion exchange polymers of the present invention are beneficial when used with blood for removing and isolating varying ions and ionogenic molecules.

In still yet another embodiment, the present invention relates to a polymer with a hemocompatibilizing surface coating. In a further embodiment, the coated polymer is manufactured by a one step process comprising: simultaneously coating and polymerizing monomer droplets in a suspension polymerization procedure with at least one dispersing agent having encapsulated the droplets with a hemocompatible coating to thereby form a polymer with a hemocompatible surface-coating grafted onto the surface of the polymer beads.

In another embodiment, the present invention relates to a method of manufacturing a biocompatible and hemocompatible surface coated polymer. In still another embodiment, the method comprises: polymerizing monomer droplets comprising at least one crosslinking agent and simultaneously coating the resulting polymer beads using at least one dispersing agent to form a biocompatible surface coated polymer. In still another embodiment, the coated polymers are hemocompatible. In yet another embodiment, the polymer is formed using a suspension polymerization procedure. In another embodiment, the polymer is formed using an emulsion polymerization procedure followed by growing the particles with additional monomer feed.

In still another embodiment, the present invention relates to an application of use whereby the hemocompatible surface coated polymers of the present invention are utilized for medical applications. In another embodiment, the hemocompatible polymers of the present invention may be used to isolate and/or remove target substances from blood and physiological fluids and for specific treatments. In a further embodiment, the hemocompatible polymers of the present invention may be used in preserving organs. In yet another embodiment, the present invention relates to an apparatus for isolating blood components and for purifying blood using the hemocompatible surface coated polymers of the present invention. In one embodiment, the apparatus comprises a cartridge containing the hemocompatible polymers of the present invention.

In yet a further embodiment, the present invention relates to a polymer with a hemocompatible surface coating, the polymer being manufactured by a method comprising: polymerizing monomer droplets comprising at least one crosslinking agent to form a polymer and developing a surface coating on the polymer by using at least one dispersing agent carrying hydroxyl groups followed by a reaction of hydroxyl groups with a vinyl monomer or polymer to thereby form the hemocompatible surface coating on the polymer.

In still yet a further embodiment, the present invention also relates to a method of manufacturing a hemocompatible surface coated polymer using a one step process, the method comprising: polymerizing monomer droplets comprising at least one crosslinking agent to form a polymer and developing a surface coating on the polymer by using at least one dispersing agent carrying hydroxyl groups followed by a reaction of hydroxyl groups with a vinyl monomer or polymer to thereby form the hemocompatible surface coating on the polymer.

In another embodiment, the present invention relates to a polymer having a hemocompatible-coated surface, the polymer being manufactured by a two-step process comprising: polymerizing monomer droplets comprising at least one crosslinking agent and at least one dispersing agent to form a polymer; and coating the surface of the polymer by crosslinking a monovinyl monomer and a polyfunctional monomer mixture over the surface of the polymer bead to thereby form the hemocompatible coating on the surface of the polymer.

In a further embodiment, the present invention relates to a method comprising: polymerizing monomer droplets comprising at least one crosslinking agent and at least one dispersing agent to form a polymer; and coating the surface of the polymer by crosslinking a monovinyl monomer and a polyfunctional monomer mixture over the surface of the polymer bead to thereby form the hemocompatible coating on the surface of the polymer.

In another embodiment, the present invention relates to a hemocompatible system comprising an organic phase and an aqueous phase, wherein the organic phase composed of the polymerizable monomers and the porogen are dispersed into a slurry of droplets by agitation throughout the aqueous phase which is formulated to effect the stability of the droplets by the water-miscible dispersant and to quench polymer growth in the aqueous phase by carrying a water-soluble free radical inhibitor.

In a further embodiment, the present invention provides for a hemocompatible-coated polymer comprising at least one crosslinking agent and at least one dispersing agent whereby said dispersing agent forms a hemocompatible surface on said polymer, said dispersing agent is selected from a group consisting of heparin, albumin, carrageenan, konjac flour (glucomannan), guar gum (galactomannan), xanthan gum (polysaccharide of mannose, glucose, and glucuronic acid), gum arabic, gum tragacanth, locust bean gum, karaya gum, salts of carboxymethylcellulose, salts of carboxyethylcellulose, hydrophobically modified hydroxyethylcellulose (Natrosol Plus HMHEC, Grade 330), salts of hyaluronic acid, salts of poly(maleic acid), salts of poly(maleic acid-co-acrylic acid), salts of poly(maleic acid-co-methacrylic acid), salts of poly(itaconic acid), Type B gelatin, poly(ethylene oxide), poly(propylene oxide), poly(acrylamide), poly(methacrylamide), salts of poly(acrylamide-co-acrylic acid), salts of poly(acrylamide-co-methacrylic acid), salts of poly(methacrylamide acrylic acid), salts of poly(methacrylamide-co-methacrylic acid) and mixtures thereof, said crosslinking agent is selected from a group consisting of divinylbenzene, trivinylbenzene, divinylnaphthalene, trivinylcyclohexane, divinylsulfone, trimethylolpropane trimethacrylate, trimethylolpropane dimethacrylate, trimethylolpropane triacrylate, trimethylolpropane diacrylate, pentaerythrital dimethacrylate, pentaerythrital trimethacrylate, pentaerythrital tetramethacrylate, pentaerythritol diacrylate, pentaerythritol triacrylate, pentaerythritol tetraacrylate, dipentaerythritol dimethacrylate, dipentaerythritol trimethacrylate, dipentaerythritol tetramethacrylate, dipentaerythritol diacrylate, dipentaerythritol triacrylate, dipentaerythritol tetraacrylate, divinylformamide and mixtures thereof, said polymer being developed simultaneously with the formation of the coating, wherein said dispersing agent gets chemically bound to said surface of said polymer.

In still a further embodiment, the present invention relates to a biocompatible coated polymer manufactured by a method comprising: polymerizing monomer droplets comprising at least one crosslinking agent to form a polymer and coating said resulting polymer using at least one dispersing agent to thereby form a biocompatible coated polymer, said dispersant being placed on said monomer droplets before polymerization, said dispersing agent is selected from a group consisting of heparin, albumin, carrageenen, konjac flour (glucomannan), guar gum (galactomannan), xanthan gum (polysaccharide of mannose, glucose, and glucuronic acid), gum arabic, gum tragacanth, locust bean gum, karaya gum, salts of carboxymethylcellulose, salts of carboxyethylcellulose, hydrophobically modified hydroxyethylcellulose (Natrosol Plus HMHEC, Grade 330), salts of hyaluronic acid, salts of poly(maleic acid), salts of poly(maleic acid-co-acrylic acid), salts of poly(maleic acid-co-methacrylic acid), salts of poly(itaconic acid), Type B gelatin, poly(ethylene oxide), poly(propylene oxide), poly(acrylamide), poly(methacrylamide), salts of poly(acrylamide-co-acrylic acid), salts of poly(acrylamide-co-methacrylic acid), salts of poly(methacrylamide-co-acrylic acid), salts of poly(methacrylamide-co-methacrylic acid) and mixtures thereof, wherein said dispersing agent gets chemically bound to said surface of said polymer.

In another embodiment, the invention provides for a hemocompatible surface coated polymer system comprising an organic phase and an aqueous phase, said organic phase comprising polymerizable monomers and at least one initiator and said aqueous phase comprising at least one dispersing agent, at least one free radical inhibitor and at least one buffering agent, said organic phase being immiscible in said aqueous phase, wherein the organic phase forms a polymer, and wherein said dispersing agent in the aqueous phase forms a hemocompatible surface on said polymer said dispersing agent is selected from a group consisting of heparin, albumin, carrageenan, konjac flour (galactomannan), xanthan gum (polysaccharide of mannose, glucose, and glucuronic Acid), gum arabic, gum tragacanth, locust bean gum, karaya gum, salts of carboxymethylcellulose, salts of carboxyethylcellulose, hydrophobically modified hydroxyethylcellulose (Natrosol Plus HMHEC, Grade 330), salts of hyaluronic acid, salts of poly(maleic acid), salts of poly(maleic acid-co-acrylic acid), salts of poly(maleic acid-co-methacrylic acid), salts of poly(itaconic acid), Type B gelatin, poly(ethylene oxide), poly(propylene oxide), poly(acrylamide), poly(methacrylamide), salts of poly(acrylamide-co-acrylic acid), salts of poly(acrylamide-co-methacrylic acid), salts of poly(methacrylamide-co-acrylic acid), salts of poly(methacrylamide-co-methacrylic acid) and mixtures thereof.

In another further embodiment, the invention relates to a containment device for housing hemocompatible polymers, said device comprising a housing with an entrance and an exit, said hemocompatible polymers being situated within said housing of said device, hemocompatible-coated polymer comprising at least one crosslinking agent and at least one dispersing agent whereby said dispersing agent forms a hemocompatible surface on said polymer.

In still another embodiment, the dispersing agent in the device is selected from a group consisting of hydroxyethyl cellulose, hydroxypopyl cellulose, poly(hydroxyethyl methacrylate), poly(hydroxyethyl acrylate), poly(hydroxypropyl methacrylate), poly(hydroxypropyl acrylate), poly (dimethylaminoethyl methacrylate), poly-(dimethylaminoethyl acrylate), poly(diethylamimoethyl methacrylate), poly-(diethylaminoethyl acrylate), poly(vinyl alcohol), poly(N-vinylpyrrolidinone), salts of poly(methacrylic acid), and salts of poly(acrylic acid), heparin, albumin, carrageenan, konjac flour (glucomannan), guar gum (galactomannan), xanthan gum (polysaccharide of mannose, glucose, and glucuronic acid), gum arabic, gum tragacanth, locust bean gum, karaya gum, salts of carboxymethylcellulose, salts of carboxyethylcellulose, hydrophobically modified hydroxyethylcellulose (Natrosol Plus HMHEC, Grade 330), salts of hyaluronic acid, salts of poly(maleic acid), salts of poly(maleic acid-co-acrylic acid), salts of poly(maleic acid-co-methacrylic acid), salts of poly(itaconic acid), Type B gelatin, poly(ethylene oxide), poly(propylene oxide), poly(acrylamide), poly(methacrylamide), salts of poly(acrylamide-co-acrylic acid), salts of poly(acrylamide-co-methacrylic acid), salts of poly(methacrylamide-co-acrylic acid), salts of poly(methacrylamide-co-methacrylic acid) and mixtures thereof.

In yet another embodiment, the crosslinking agent in the device is selected from a group consisting of divinylbenzene, trivinylbenzene, divinylnaphthalene, trivinylcyclohexane, divinylsulfone, trimethylolpropane trimethacrylate, trimethylolpropane dimethacrylate, trimethylolpropane triacrylate, trimethylolpropane diacrylate, pentaerythrital dimethacrylate, pentaerythrital trimethacrylate, pentaerythrital tetramethacrylate, pentaerythritol diacrylate, pentaerythritol triacrylate, pentaerythritol tetraacrylate, dipentaerythritol dimethacrylate, dipentaerythritol trimethacrylate, dipentaerythritol tetramethacrylate, dipentaerythritol diacrylate, dipentaerythritol triacrylate, dipentaerythritol tetraacrylate, divinylformamide and mixtures thereof.

In still yet another embodiment, the device further comprises a polycarbonate canister with two polycarbonate end caps with male leur blood connectors, two polypropylene port plugs, two silicone O-rings and two screen assemblies designed to retain said polymers within said canister.

In a further embodiment, the apparatus for containing hemocompatible polymers, said apparatus comprising a housing and a hemocompatible surface coated polymer system situated within said housing, said system comprising an organic phase and an aqueous phase, said organic phase comprising polymerizable monomers and at least one initiator and said aqueous phase comprising at least one dispersing agent, at least one free radical inhibitor and at least one buffering agent, said organic phase being immiscible in said aqueous phase, wherein the organic phase forms a polymer, and wherein said dispersing agent in the aqueous phase forms a hemocompatible surface on said polymer said dispersing agent is selected from a group consisting of hydroxyethyl cellulose, hydroxypopyl cellulose, poly(hydroxyethyl methacrylate), poly(hydroxyethyl acrylate), poly(hydroxypropyl methacrylate), poly(hydroxypropyl acrylate), poly(dimethylaminoethyl methacrylate), poly-(dimethylaminoethyl acrylate), poly(diethylamimoethyl methacrylate), poly-(diethylaminoethyl acrylate), poly(vinyl alcohol), poly(N-vinylpyrrolidinone), salts of poly(methacrylic acid), and salts of poly(acrylic acid), heparin, albumin, carrageenan, konjac flour (glucomannan), guar gum (galactomannan), xanthan gum (polysaccharide of mannose, glucose, and glucuronic acid), gum arabic, gum tragacanth, locust bean gum, karaya gum, salts of carboxymethylcellulose, salts of carboxyethylcellulose, hydrophobically modified hydroxyethylcellulose (Natrosol Plus HMHEC, Grade 330), salts of hyaluronic acid, salts of poly(maleic acid), salts of poly(maleic acid-co-acrylic acid), salts of poly(maleic acid-co-methacrylic acid), salts of poly(itaconic acid), Type B gelatin, poly(ethylene oxide), poly(propylene oxide), poly(acrylamide), poly(methacrylamide), salts of poly(acrylamide-co-acrylic acid), salts of poly(acrylamide-co-methacrylic acid), salts of poly(methacrylamide-co-acrylic acid), salts of poly(methacrylamide-co-methacrylic acid) and mixtures thereof.

In another further embodiment, the apparatus further comprises a polycarbonate canister with two polycarbonate end caps with male leur blood connectors, two polypropylene port plugs, two silicone O-rings and two screen assemblies designed to retain said polymers within said canister.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessary to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

The specific example below will enable the invention to be better understood. However, they are given merely by way of guidance and do not imply any limitation.

The specific example below will enable the invention to be better understood. However, they are given merely by way of guidance and do not imply any limitation.

EXAMPLE 1

The first polymer synthesis was targeted at an aqueous to organic volume ratio of 1.0. Table 1 below illustrates the targeted dispersion mixture designed for Example 1 using a fifty (50) liter reaction.

TABLE 1

| Dispersion Mixture Desires for 50 Liters | |
|---|---|
| Aqueous/Organic Volume Ratio | 1.0 |
| Volume of Organic Phase, ml | 25,000.0 |
| Volume of Aqueous Phase, ml | 25,000.0 |
| Density of Organic Phase, g/ml | 0.83490 |
| Weight of Organic Phase, g | 20,872.5 |
| Density of Aqueous Phase, g/ml | 1.005 |
| Weight of Aqueous Phase, g | 25,125.0 |
| Polymerizable Monomers, DVB plus EVB, g | 8766.45 |
| Total Volume of Organic & Aqueous Phases, ml | 50,000.0 |
| Total Weight of Organic & Aqueous Phases, g | 45,997.5 |

The procedure for the polymerization in Example 1 is initiated by the preparation of an aqueous phase and an organic phase. Table 2 and 3 below illustrate the components of the aqueous phase composition for the polymer synthesis by weight percent (%) and by quantity of the components in grams (g), respectively.

TABLE 2

| Aqueous Phase Composition | |
|---|---|
| Ultrapure Water, wt. % | 98.089 |
| Water from Aqueous 45% Solution of Poly(N-vinylpyrrolidinone), wt. % | 0.611 |
| Poly(N-vinylpyrrolidinone) Pure, wt. % | 0.500 |
| Sodium Carbonate, wt. % | 0.500 |
| Sodium Nitrite, wt. % | 0.300 |

Other dispersants, such as poly(vinyl alcohol) have been used as a substitute for the poly(N-vinylpyrrolidinone).

TABLE 3

| Aqueous Phase Charges | |
|---|---|
| Ultrapure Water, g | 24,644.83 |
| Water from Aqueous 45% Solution of Poly(N-vinylpyrrolidinone), g | (153.542) |
| Poly(N-vinylpyrrolidinone) Pure, g | (125.625) |
| Aqueous Poly(N-vinylpyrrolidinone) Solution, 45 wt. %, g | 279.167 |
| Sodium Carbonate, g | 125.625 |
| Sodium Nitrite, g | 75.375 |
| Weights in parenthesis are part of other charged materials | |
| Total Weight of Aqueous Phase, g | 25,124.997 |

Table 4 and 5 illustrate the components of the organic phase composition for the polymer synthesis by weight percent (5) and by quantity of the components in grams (g), respectively.

TABLE 4

| Organic Phase Composition | |
|---|---|
| Divinylbenzene (DVB), wt. % | 26.998 |
| Ethylvinylbenzene (EVB), wt. % | 15.0024 |
| Inerts, wt. % | 0.41567 |
| Toluene, wt. % | 27.134 |
| Isooctane, wt. % | 30.450 |
| Benzoyl Peroxide, wt. % of polymerizable monomers | 1.03 |

Other immiscible porogens such as isooctane, cyclohexane and nonane have been substituted, both singularly and in combination with one another, for the mixture of toluene and isooctane.

TABLE 5

| Organic Phase Charges | |
|---|---|
| Divinylbenzene, Pure, g | (5635.069) |
| Ethylvinylbenzene, Pure, g | (3131.381) |
| Commercial DVB, Dow 63.5%, g | 8853.211 |
| Inerts, g | (86.761) |
| Toluene, g | 5663.613 |
| Isooctane, g | 6355.676 |
| Weights in parenthesis are part of commercial DVB | |
| Total Weight of Organic Phase, g (excluding BPO) | 20,872.50 |
| Benzoyl Peroxide, BPO, Pure, g | 90.294 |
| 75 weight percent BPO, g | 120.393 |
| 97 weight oercent BPO, g | 93.087 |

Upon preparation of the aqueous and organic phases, the aqueous phase is introduced into the reactor. The reactor is set at an agitation rate sufficient to produce droplet slurry throughout the reaction volume. The aqueous phase is then heated to 65 degrees Celsius with agitation and a nitrogen sweep through the headspace in order to displace oxygen from the reactor space. The organic phase is then introduced into the reactor by pouring or pumping the organic phase onto the aqueous phase under agitation at a stirring rate of at least 86 revolutions per minute. The droplet dispersion is then stirred at 86 revolutions per minute for at least fifteen (15) minutes to set the droplet size and allow the droplet slurry to equilibrate as the temperature is raised from about 65 degrees to about 70 degrees Celsius. Once the droplet dispersion is homogenous throughout the reaction volume, the slurry is then heated to about 75 plus or minus 2.0 degrees Celsius and held at that temperature for ten (10) hours.

The slurry is cooled to about 70 degrees Celsius and the stirrer is turned off, and the polymer beads are allowed to collect at the top of the fluid bed. The mother liquor is then removed from the bottom of the reactor via a pump until the bead bed approaches within about one (1) inch from the bottom of the reactor. The mother liquor is discarded.

A sufficient amount of ultrapure water at ambient temperature is added to fluidize the bead bed and the slurry is heated to 60%. The quantity of water needed to wash the beads will be approximately one (1) bed volume or about 25 liters of water. Upon adding the water, the stirrer is then restarted and agitated at a stir rate of 106 revolutions per minute for about thirty (30) minutes while being heated to 60%. The stirring is stopped and the beads are allowed to collect at the top of the fluid bed.

The liquor is then drained from the bottom of the reactor via a pump until the bead bed approaches within about one (1) inch from the bottom of the reactor. The wash liquor is discarded. The beads are then washed with the 60 degree Celsius ultrapure water for at least five (5) washes or until the bulk fluid is transparent and free of junk polymer (a clear liquor is achieved). The water-wet bead slurry is transferred to a column that is fitted with a solid-liquid separator at the bottom of the column. The separator may be a mesh or screen made from Teflon, nylon, polypropylene, stainless steel, or glass with pore openings in the size from about 100 to about 300 microns.

The porogen mixture is displaced from the beads by a downflow treatment with ten (10) bed volumes of isopropyl alcohol at a flow rate of one (1) bed volume per hour. The isopropyl alcohol is displaced from the beads with water at a downflow treatment with ten (10) bed volumes of ultrapure water (pyrogen and endotoxin free) at a flow rate of one (1)

bed volume per hour. The polymer beads are then transferred from the column into plastic containers for transport to the thermal steam-flux cleaner.

Alternatively, the porogen is displaced from the beads by a thermal-gas-flux treatment in which the porogen filled beads are heated from about 150 degrees to about 180 degrees Celsius under an upflow gas flux for approximately six (6) hours. The hot gas flux can be either super heated stream or hot nitrogen gas. The dried, cleaned, porogen free beads are wetted out with an aqueous solution of isopropyl alcohol in water for further handling prior to being packed into containers.

EXAMPLE 2

Other experimental procedures were conducted to make the polymeric beads manufactured by similar polymerization procedures described in Example 1 and under the variations identified in the Table of Inputs (Table 6) with the resulting responses tabulated in the Tables of responses (Table 7). Tables 6 & 7 are set forth below:

TABLE 6

Experimental Program: Input

| LDM | Sample ID 02-001 | Sample ID 02-004 | Sample ID 02-006 | Sample ID 02-008 | Sample ID 02-010 | Sample ID 02-012 | Sample ID 02-015 | Sample ID 02-016 |
|---|---|---|---|---|---|---|---|---|
| Organic Phase Composition | | | | | | | | |
| Monomer (DVB & EVB) Wt. % | 42.0 | 42.0 | 42.0 | 42.0 | 40.7 | 50.0 | 40.0 | 40.0 |
| Porogen Wt. % | 58.0 | 58.0 | 58.0 | 58.0 | 59.3 | 50.0 | 60.0 | 60.0 |
| Porogen/Monomer Ratio | 1.3810 | 1.3810 | 1.3810 | 1.3810 | 1.457 | 1.000 | 1.500 | 1.500 |
| Benzoyl Peroxide (BPO) Wt. % | 1.03 | 1.03 | 1.03 | 1.03 | 1.03 | 1.03 | 1.03 | 1.03 |
| Porogen Composition | | | | | | | | |
| Isooctane, Wt. % | 52.5 | 52.5 | 52.5 | 52.5 | 53.5 | 60.0 | 99.327 | 99.327 |
| Toluene, Wt. % | 46.769 | 46.769 | 46.769 | 46.769 | 45.81 | 38.99 | 0 | 0 |
| Inerts, Wt % | 0.731 | 0.731 | 0.731 | 0.731 | 0.693 | 1.010 | 0.6734 | 0.6734 |
| Toluene, plus Inerts, Wt. % | 47.5 | 47.5 | 47.5 | 47.5 | 46.5 | 40.0 | — | — |
| Isooctane/Toluene plus Inerts Ratio | 1.105 | 1.105 | 1.105 | 1.105 | 1.1505 | 1.500 | — | — |
| Aquoeus Phase Composition | | | | | | | | |
| Sodium Carbonte, Wt. % | 0.500 | 0.500 | 0.500 | 0.500 | 0.500 | 0.500 | 0.500 | 0.500 |
| Sodium Nitrite, Wt. % | 0.300 | 0.300 | 0.300 | 0.300 | 0.300 | 0.300 | 0.300 | 0.300 |
| Poly (N-Vinylpyrrolidione), Wt. % | 0.500 | 0.500 | 0.450 | 0.400 | 0.400 | 0.400 | 0.100 | 0.400 |
| PVP K 30, 45-55 Kdaltons, Wt. % | 0 | 0 | 0 | 0 | 0 | 0 | 0 | 0 |
| PVP K 60, 400-500 Kdaltons, Wt. % | 0.500 | 0.500 | 0.450 | 0.400 | 0.400 | 0.400 | 0.100 | 0.400 |
| Poly (Vinyl alcohol), Wt. % | 0.01 | 0.01 | 0.05 | 0.100 | 0.100 | 0.100 | 0.400 | 0.100 |
| Molecular Size, Kdaltons | 88.0 | 88.0 | 95.0 | 95.0 | 95.0 | 95.0 | 95.0 | 95.0 |
| Amount Hydrolized, % | 85 | 85 | 95 | 95 | 95 | 95 | 95 | 95 |
| Aqueous/Organic Phase Volume Ratio | 0.9 | 0.9 | 0.9 | 0.9 | 0.9 | 0.9 | 0.9 | 0.9 |

| LDM | Sample ID 02-017 | Sample ID 02-022 | Sample ID 02-025 | Sample ID 02-028 | Sample ID 02-029 | Sample ID 02-030 | Sample ID 02-031 | Sample ID 02-032 |
|---|---|---|---|---|---|---|---|---|
| Organic Phase Composition | | | | | | | | |
| Monomer (DVB & EVB) Wt. % | 45.0 | 45.0 | 45.0 | 45.0 | 45.0 | 45.0 | 45.0 | 45.0 |
| Porogen Wt. % | 55.0 | 55.0 | 55.0 | 55.0 | 55.0 | 55.0 | 55.0 | 55.0 |
| Porogen/Monomer Ratio | 1.222 | 1.222 | 1.222 | 1.222 | 1.222 | 1.222 | 1.222 | 1.222 |
| Benzoyl Peroxide (BPO) Wt. % | 1.03 | 1.03 | 1.03 | 1.03 | 1.03 | 1.03 | 1.03 | 1.03 |
| Porogen Composition | | | | | | | | |
| Isooctane. Wt. % | 99.174 | 99.174 | 99.274 | 99.274 | 99.274 | 99.274 | 99.274 | 99.274 |
| Toluene, Wt. % | 0 | 0 | 0 | 0 | 0 | 0 | 0 | 0 |
| Inerts, Wt % | 0.826 | 0.826 | 0.726 | 0.726 | 0.726 | 0.726 | 0.726 | 0.726 |
| Toluene, plus Inerts, Wt. % | — | — | — | — | — | — | — | — |
| Isooctane/Toluene plus Inerts Ratio | — | — | — | — | — | — | — | — |
| Aquoeus Phase Composition | | | | | | | | |
| Sodium Carbonte, Wt. % | 0.500 | 0.500 | 0.500 | 0.500 | 0.500 | 0.500 | 0.500 | 0.500 |
| Sodium Nitrite, Wt. % | 0.300 | 0.300 | 0.300 | 0.300 | 0.300 | 0.300 | 0.300 | 0.300 |
| Poly (N-Vinylpyrrolidione), Wt. % | 0.500 | 0.500 | 1.000 | 0.700 | 0.900 | 1.000 | 1.000 | 1.500 |
| PVP K 30, 45-55 Kdaltons, Wt. % | 0 | 0.250 | 1.000 | 0.700 | 0.900 | 1.000 | 1.000 | 1.500 |
| PVP K 60, 400-500 Kdaltons, Wt. % | 0.500 | 0.250 | 0 | 0 | 0 | 0 | 0 | 0 |
| Poly (Vinyl alcohol), Wt. % | 0 | 0 | 0 | 0 | 0 | 0 | 0 | 0 |
| Molecular Size, Kdaltons | — | — | — | — | — | — | — | — |

TABLE 6-continued

| Experimental Program: Input | | | | | | | | |
|---|---|---|---|---|---|---|---|---|
| Amount Hydrolized, % | — | — | — | — | — | — | — | — |
| Aqueous/Organic Phase Volume Ratio | 0.9 | 1.1 | 1.1 | 1.2 | 1.2 | 1.145 | 1.2 | 1.2 |

| LDM | Sample ID 02-033 | Sample ID 02-034 | Sample ID 02-036 | Sample ID 02-038 | Sample ID 02-040 | Sample ID 02-042 | Sample ID 02-044 | Sample ID 02-047 |
|---|---|---|---|---|---|---|---|---|
| Organic Phase Composition | | | | | | | | |
| Monomer (DVB & EVB) Wt. % | 50.0 | 55.0 | 55.0 | 55.0 | 55.0 | 55.0 | 55.0 | 55.0 |
| Porogen Wt. % | 50.0 | 45.0 | 45.0 | 45.0 | 45.0 | 45.0 | 45.0 | 45.0 |
| Porogen/Monomer Ratio | 1.000 | 0.8182 | 0.8182 | 0.8182 | 0.8182 | 0.8182 | 0.8182 | 0.8182 |
| Benzoyl Peroxide (BPO) Wt. % | 1.03 | 1.03 | 1.03 | 1.03 | 1.03 | 1.03 | 1.03 | 1.03 |
| Porogen Composition | | | | | | | | |
| Isooctane. Wt. % | 99.112 | 98.915 | 98.915 | 98.915 | 98.915 | 98.915 | 98.915 | 98.915 |
| Toluene, Wt. % | 0 | 0 | 0 | 0 | 0 | 0 | 0 | 0 |
| Inerts, Wt % | 0.8878 | 1.085 | 1.085 | 1.085 | 1.085 | 1.085 | 1.085 | 1.085 |
| Toluene, plus Inerts, Wt. % | — | — | — | — | — | — | — | — |
| Isooctane/Toluene plus Inerts Ratio | — | — | — | — | — | — | — | — |
| Aquoeus Phase Composition | | | | | | | | |
| Sodium Carbonte, Wt. % | 0.500 | 0.500 | 0.500 | 0.500 | 0.500 | 0.500 | 0.500 | 0.300 |
| Sodium Nitrite, Wt. % | 0.300 | 0.300 | 0.300 | 0.300 | 0.300 | 0.300 | 0.300 | 0.300 |
| Poly (N-Vinylpyrrolidione), Wt. % | 1.000 | 0.500 | 1.300 | 1.100 | 1.000 | 0.200 | 0.300 | 0.010 |
| PVP K 30, 45-55 Kdaltons, Wt. % | 0.9 | 0 | 1.000 | 1.000 | 0.800 | 0 | 0 | 0.010 |
| PVP K 60, 400-500 Kdaltons, Wt. % | 0.100 | 0.500 | 0.300 | 0.100 | 0.200 | 0.200 | 0.300 | 0 |
| Poly (Vinyl alcohol), Wt. % | 0 | 0 | 0 | 0 | 0 | 0 | 0 | 0.250 |
| Molecular Size, Kdaltons | — | — | — | — | — | — | — | 95 |
| Amount Hydrolized, % | — | — | — | — | — | — | — | 95 |
| Natrosol Plus, Wt. % | | | | | | | | 0 |
| Aqueous/Organic Phase Volume Ratio | 1.1 | 1.1 | 1.0 | 1.0 | 1.0 | 1.0 | 1.0 | 1.0 |

| LDM | Sample ID 02-049 | Sample ID 02-050 | Sample ID 02-052 | Sample ID 02-054 | Sample ID 02-055 | Sample ID 02-059 | Sample ID 02-061 | Sample ID 02-073 |
|---|---|---|---|---|---|---|---|---|
| Organic Phase Composition | | | | | | | | |
| Monomer (DVB & EVB) Wt. % | 55.0 | 55.0 | 55.0 | 55.0 | 55.0 | 55.0 | 55.0 | 55.0 |
| Porogen Wt. % | 45.0 | 45.0 | 45.0 | 45.0 | 45.0 | 45.0 | 45.0 | 45.0 |
| Porogen/Monomer Ratio | 0.8182 | 0.8182 | 0.8182 | 0.8182 | 0.8182 | 0.8182 | 0.8182 | 0.8182 |
| Benzoyl Peroxide (BPO) Wt. % | 1.03 | 1.03 | 1.03 | 1.03 | 1.03 | 1.03 | 1.03 | 1.03 |
| Porogen Composition | | | | | | | | |
| Isooctane. Wt. % | 98.915 | 98.915 | 98.915 | 98.915 | 98.915 | 98.915 | 98.915 | 98.915 |
| Toluene, Wt. % | 0 | 0 | 0 | 0 | 0 | 0 | 0 | 0 |
| Inerts, Wt % | 1.085 | 1.085 | 1.085 | 1.085 | 1.085 | 1.085 | 1.085 | 1.085 |
| Toluene, plus Inerts, Wt. % | — | — | — | — | — | — | — | — |
| Isooctane/Toluene plus Inerts Ratio | — | — | — | — | — | — | — | — |
| Aquoeus Phase Composition | | | | | | | | |
| Sodium Carbonte, Wt. % | 0.100 | 0.500 | 0.500 | 0.500 | 0.500 | 0.500 | 0.500 | 0.500 |
| Sodium Nitrite, Wt. % | 0.100 | 0.300 | 0.300 | 0.300 | 0.300 | 0.300 | 0.300 | 0.300 |
| Poly (N-Vinylpyrrolidione), Wt. % | 0.010 | 0 | 0.05 | 0 | 0 | 0 | 0 | 0 |
| PVP K 30, 45-55 Kdaltons, Wt. % | 0.010 | 0 | 0.05 | 0 | 0 | 0 | 0 | 0 |
| PVP K 60, 400-500 Kdaltons, Wt. % | 0 | 0 | 0 | 0 | 0 | 0 | 0 | 0 |
| Poly (Vinyl alcohol), Wt. % | 0.400 | 0 | 0 | 0 | 0 | 0 | 0.300 | 0.300 |
| Molecular Size, Kdaltons | 95 | — | — | — | — | 170 | 170 | 170 |
| Amount Hydrolized, % | 95 | — | — | — | — | 88 | 88 | 88 |
| Natrosol Plus, Wt. % | 0 | 0.500 | 0.300 | 0.300 | 0.300 | 0 | 0 | 0 |
| Aqueous/Organic Phase Volume Ratio | 1.0 | 1.0 | 1.0 | 1.0 | 1.0 | 1.0 | 1.0 | 1.0 |

TABLE 6-continued

Experimental Program: Input

| LDM | Sample ID 02-074 | Sample ID 02-075 | Sample ID 02-079 | Sample ID 02-082 | Sample ID 02-083 | Sample ID 02-086 |
|---|---|---|---|---|---|---|
| Organic Phase Composition | | | | | | |
| Monomer (DVB & EVB) Wt. % | 55.0 | 55.0 | 55.0 | 55.0 | 55.0 | 55.0 |
| Porogen Wt. % | 45.0 | 45.0 | 45.0 | 45.0 | 45.0 | 45.0 |
| Porogen/Monomer Ratio | 0.8182 | 0.8182 | 0.8182 | 0.8182 | 0.8182 | 0.8182 |
| Benzoyl Peroxide (BPO) Wt. % | 1.03 | 1.03 | 1.03 | 1.03 | 1.03 | 1.03 |
| Porogen Composition | | | | | | |
| Isooctane. Wt. % | 98.915 | 98.915 | 98.915 | 98.915 | 98.915 | 98.915 |
| Toluene, Wt. % | 0 | 0 | 0 | 0 | 0 | 0 |
| Inerts, Wt % | 1.085 | 1.085 | 1.085 | 1.085 | 1.085 | 1.085 |
| Toluene, plus Inerts, Wt. % | — | — | — | — | — | — |
| Isooctane/Toluene plus Inerts Ratio | — | — | — | — | — | — |
| Aquoeus Phase Composition | | | | | | |
| Sodium Carbonte, Wt. % | 0.500 | 0.500 | 0.500 | 0.500 | 0.500 | 0.500 |
| Sodium Nitrite, Wt. % | 0.300 | 0.300 | 0.300 | 0.300 | 0.300 | 0.300 |
| Poly (N-Vinylpyrrolidione), Wt. % | 0 | 0 | 0 | 0 | 0 | 0 |
| PVP K 30, 45-55 Kdaltons, Wt. % | 0 | 0 | 0 | 0 | 0 | 0 |
| PVP K 60, 400-500 Kdaltons, Wt. % | 0 | 0 | 0 | 0 | 0 | 0 |
| Poly (Vinyl alcohol), Wt. % | 0.300 | 0.300 | 0.300 | 0.300 | 0.300 | 0.3 |
| Molecular Size, Kdaltons | 170 | 170 | 170 | 170 | 88 | 170 |
| Amount Hydrolized, % | 88 | 88 | 88 | 88 | 85 | 88 |
| Natrosol Plus, Wt. % | 0 | 0.05 | 0 | 0 | 0 | 0 |
| Aqueous/Organic Phase Volume Ratio | 1.0 | 1.0 | 1.0 | 1.0 | 1.0 | 1.0 |

TABLE 7

Experimental Programs: Response

| LDM | Sample ID 02-001 | Sample ID 02-004 | Sample ID 02-006 | Sample ID 02-008 | Sample ID 02-010 | Sample ID 02-017 | Sample ID 02-025 |
|---|---|---|---|---|---|---|---|
| Surface Characteristics | | | | | | | |
| SEM; description (smooth, nodes present, open or closed pore structure) | nodes, closed | nodes, closed | nodes, closed | nodes, closed | nodes, closed | no nodes, open | no nodes, open |
| Internal Pore Stucture (Dry Beads) | | | | | | | |
| BET Surfrace Area, $\bar{S}$, $m^2 g^{-1}$ | 563.5 | 652.8 | 615.7 | 614.4 | 661.4 | 520.9 | 540.0 |
| Porosity, Pwt in $ml \cdot g^{-1}$ | 0.9210 | 1.5370 | 1.53085 | 1.7245 | 1.7722 | 1.1241 | 1.3899 |
| Pore modes greater than 100 Å diameter from Desorption Isotherm. List each | 150 | 250, 400 | 250 500 | 430 550 | 490 | 250, 390, 495 640, 920 1400, 1900 | 320, 440 550, 750 1200, 2900 |
| Pore modes range in Å greater than 100 Å diameter, Desorption Isotherm. | 100-250 | 100-500 | 100-600 | 100-700 | 100-600 | 100-2300 | 100-2900 |
| Cytochrome C Sorption | | | | | | | |
| Static Assesment 500 mg/Liter Conc. | | | | | | | |
| Mg Cyto C sorbed/g dry polymer at 3 hr contact | 15.2 | 43.35 | 42.95 | 63.05 | 79.7 | 135.0 | 155.8 |
| % of Cyto C removed from solution at 3 hr contact | 19.42 | 53.80 | 51.46 | 66.22 | 73.78 | 82.64 | 82.49 |
| Serum Albumin Sorption | | | | | | | |
| % removed from solution with a concentration of 35,000 mg/l of serum albumin | | | | | | 6.1 | 4.15 |
| Mg BSA (or HSA) sorbed/g dry polymer at 3 hr contact | | | | | | 681.6 | 488.22 |

TABLE 7-continued

Experimental Programs: Response

Coating Assesment
ESCA Measurements for Surface Components, Atom Fraction on surface

| | | | | | | | |
|---|---|---|---|---|---|---|---|
| C | 0.8702 | 0.8722 | 0.8917 | 0.8881 | 0.8855 | 0.8613 | 0.8520 |
| O | 0.0784 | 0.0758 | 0.0682 | 0.0729 | 0.0860 | 0.1106 | 0.1480 |
| N | 0.0514 | 0.0520 | 0.0401 | 0.0390 | 0.0284 | 0.0281 | none detected |

| LDM | Sample ID 02-034 | Sample ID 02-036 | Sample ID 02-038 | Sample ID 02-040 | Sample ID 02-044 | Sample ID 02-054 | Sample ID 02-055A |
|---|---|---|---|---|---|---|---|
| Surface Characteristics | | | | | | | |
| SEM; description (smooth, nodes present, open or closed pore structure) | no nodes, open | no nodes, open | nodes, closed | nodes, closed | nodes, closed | nodes, closed | nodes, closed |
| Internal Pore Stucture (Dry Beads) | | | | | | | |
| BET Surfrace Area, $\overline{S}$, $m^2 g^{-1}$ | 537.2 | 556.6 | 556.6 | 549.6 | 545.4 | 536.8 | 525.2 |
| Porosity, Pwt in $ml \cdot g^{-1}$ | 1.9069 | 1.9588 | 1.8754 | 1.8356 | 1.6420 | 1.6567 | 1.6957 |
| Pore modes greater than 100 Å diameter from Desorption Isotherm. List each | 380, 490 620, 930 | 210, 280 380, 500, 650 | 210, 280, 380 500, 650, 930 | 300; 390; 500; 650; 950 | 250; 310; 450; 550; 790; 1200 | 280; 350; 460; 600; 810; 1900 | 290; 390; 500; 640; 990 |
| Pore modes range in Å greater than 100 Å diameter, Desorption Isotherm. | 100-1600 | 100-1600 | 100-1600 | 100-1600 | 100-2000 | 100-2900 | 100-1700 |
| Cytochrome C Sorption Static Assesment 500 mg/Liter Conc. | | | | | | | |
| Mg Cyto C sorbed/g dry polymer at 3 hr contact | 86.6 | 82.0 | 54.8 | 57.7 | 61.7 | 73.9 | 57.8 |
| % of Cyto C removed from solution at 3 hr contact | 85.12 | 85.26 | 57.82 | 61.43 | 65.55 | 79.83 | 63.63 |
| Serum Albumin Sorption | | | | | | | |
| % removed from solution with a concentration of 35,000 mg/l of serum albumin | 4.38 | | 4.9 | 3.07 | 4.12 | | |
| Mg BSA (or HSA) sorbed/g dry polymer at 3 hr contact | 301.46 | | 311.96 | 192.10 | 257.96 | | |
| Coating Assesment ESCA Measurements for Surface Components, Atom Fraction on surface | | | | | | | |
| C | 0.8981 | 0.8682 | 0.8901 | 0.8586 | 0.8748 | 0.8238 | 0.7924 |
| O | 0.0778 | 0.0935 | 0.0771 | 0.0982 | 0.0897 | 0.1745 | 0.2076 |
| N | 0.0241 | 0.0383 | 0.0328 | 0.0432 | 0.355 | none detected | none detected |

| LDM | Sample ID 02-075 | Sample ID 02-079 | Sample ID 02-082 | Sample ID 02-083 | Sample ID 02-086 |
|---|---|---|---|---|---|
| Surface Characteristics | | | | | |
| SEM; description (smooth, nodes present, open or closed pore structure) | | nodes, closed | | nodes, closed | |
| Internal Pore Stucture (Dry Beads) | | | | | |
| BET Surfrace Area, $\overline{S}$, $m^2 g^{-1}$ | | 531.5 | | 528.9 | |
| Porosity, Pwt in $ml \cdot g^{-1}$ | | 1.5232 | | 1.3708 | |
| Pore modes greater than 100 Å diameter from Desorption Isotherm. List each | | 200; 310; 410; 530; 740; 900; 1200 | | 210; 280; 380; 490; 620; 900; 1300 | |
| Pore modes range in Å greater than 100 Å diameter, Desorption Isotherm. | | 100-2400 | | 100-2400 | |
| Cytochrome C Sorption Static Assesment 500 mg/Liter Conc. | | | | | |
| Mg Cyto C sorbed/g dry polymer at 3 hr contact | | 32.8 | | 61.1 | |
| % of Cyto C removed from solution at 3 hr contact | | 39.00 | | 74.89 | |

TABLE 7-continued

Experimental Programs: Response

Serum Albumin Sorption

% removed from solution with
a concentration of 35,000 mg/l
of serum albumin
Mg BSA (or HSA) sorbed/g dry
polymer at 3 hr contact Coating Assesment
ESCA Measurements for Surface Components, Atom Fraction on surface

| | | |
|---|---|---|
| C | 0.8441 | 0.8830 |
| O | 0.1559 | 0.1170 |
| N | none detected | none detected |

Numerous modifications and variations of the present invention are possible in light of the above teachings. It is therefore to be understood that within the scope of the attendant claims attached hereto, this invention may be practiced otherwise than as specifically disclosed herein.

What is claimed is:

1. A hemocompatible surface coated polymer system comprising an organic phase and an aqueous phase, said organic phase comprising polymerizable monomers and at least one initiator and said aqueous phase comprising at least one dispersing agent, at least one free radical inhibitor and at least one buffering agent, said organic phase being immiscible in said aqueous phase, wherein the organic phase forms a polymer, and wherein said dispersing agent in the aqueous phase forms a hemocompatible surface on said polymer said dispersing agent is selected from a group consisting of albumin, carrageenan, konjac flour (glucomannan), guar gum (galactomannan), xanthan gum (polysaccharide of mannose, glucose, and glucuronic acid), gum arabic, gum tragacanth, locust bean gum, karaya gum, salts of carboxymethylcellulose, salts of carboxyethylcellulose, salts of hyaluronic acid, salts of poly(maleic acid), salts of poly(maleic acid-co-acrylic acid), salts of poly(maleic acid-co-methacrylic acid), salts of poly(itaconic acid), Type B gelatin, poly(acrylamide), poly(methacrylamide), salts of poly(acrylamide-co-acrylic acid), salts of poly(acrylamide-co-methacrylic acid), salts of poly(methacrylamide-co-acrylic acid), salts of poly(methacrylamide-co-methacrylic acid) and mixtures thereof.

2. The system of claim 1 wherein one of said monomer is a monofunctional monomer, said monofunctional monomer is selected from a group consisting of styrene, ethylstyrene, acrylonitrile, butyl methacrylate, octyl methacrylate, butyl acrylate, octyl acrylate, cetyl methacrylate, cetyl acrylate, ethyl methacrylate, ethyl acrylate, vinyltoluene, vinylnaphthalene, vinylbenzyl alcohol, vinylformamide, methyl methacrylate, methyl acrylate and mixtures thereof.

3. The system of claim 1 wherein one of said monomer is a polyfunctional monomer, said polyfunctional monomer is selected from a group consisting of divinylbenzene, trivinylbenzene, divinylnaphthalene, trivinylcyclohexane, divinylsulfone, trimethylolpropane trimethacrylate, trimethylolpropane dimethacrylate, trimethylolpropane triacrylate, trimethylolpropane diacrylate, pentaerythritol dimethacrylate, pentaerythritol trimethacrylate, pentaerythritol tetramethacrylate, pentaerythritol diacrylate, pentaerythritol triacrylate, pentaerythritol tetraacrylate, dipentaerythritol dimethacrylate, dipentaerythritol trimethacrylate, dipentaerythritol tetramethacrylate, dipentaerythritol diacrylate, dipentaerythritol triacrylate, dipentaerythritol tetraacrylate, divinylformamide and mixtures thereof.

4. The system of claim 1 wherein said initiator is selected from a group consisting of diacyl peroxides, ketone peroxides, peroxyesters, dialkyl peroxides, peroxyketals, azoalkylnitriles, peroxydicarbonates and mixtures thereof.

5. The system of claim 1 wherein said free radical inhibitor is selected from a group consisting of p-nitrosophenoxide salts, sodium nitrite, N-hydroxy-N-methylglucamine, N-nitroso-N-methylglucamine and mixtures thereof.

6. The system of claim 1 wherein said buffering agent is selected from a group consisting of carbonate salts, bicarbonate salts, boric acid salts, salts of phosphoric acid and mixtures thereof.

7. The system of claim 1 wherein said organic phase further comprises at least one porogen, said porogen being selected from a group consisting of aliphatic hydrocarbons, dialkyl ketones, aliphatic carbinols and mixtures thereof.

8. An apparatus for containing hemocompatible polymers, said apparatus comprising a housing and a hemocompatible surface coated polymer system situated within said housing, said system comprising an organic phase and an aqueous phase, said organic phase comprising polymerizable monomers and at least one initiator and said aqueous phase comprising at least one dispersing agent, at least one free radical inhibitor and at least one buffering agent, said organic phase being immiscible in said aqueous phase, wherein the organic phase forms a polymer, and wherein said dispersing agent in the aqueous phase forms a hemocompatible surface on said polymer said dispersing agent is selected from a group consisting of albumin, carrageenan, konjac flour (glucomannan), guar gum (galactomannan), xanthan gum (polysaccharide of mannose, glucose, and glucuronic acid), gum arabic, gum tragacanth, locust bean gum, karaya gum, salts of carboxymethylcellulose, salts of carboxyethylcellulose, salts of hyaluronic acid, salts of poly(maleic acid), salts of poly(maleic acid-co-acrylic acid), salts of poly(maleic acid-co-methacrylic acid), salts of poly(itaconic acid), Type B gelatin, poly(acrylamide), poly(methacrylamide), salts of poly(acrylamide-co-acrylic acid), salts of poly(acrylamide-co-methacrylic acid), salts of poly(methacrylamide-co-acrylic acid), salts of poly(methacrylamide-co-methacrylic acid) and mixtures thereof.

* * * * *